United States Patent [19]

Takeda et al.

[11] Patent Number: 5,769,305
[45] Date of Patent: Jun. 23, 1998

[54] APPARATUS FOR WAVE SOLDERING PRINTED WIRING BOARDS

[75] Inventors: Toshio Takeda, Machida; Yogo Kaneko, Fujisawa, both of Japan

[73] Assignee: Nihon Den-Netsu Keiki Co., Ltd., Japan

[21] Appl. No.: 684,587

[22] Filed: Jul. 19, 1996

[30] Foreign Application Priority Data

Aug. 2, 1995 [JP] Japan .................................. 7-197389

[51] Int. Cl.⁶ .............................. B23K 3/06; B23K 35/38
[52] U.S. Cl. .............................................. 228/37; 228/42
[58] Field of Search ................................ 228/37, 42, 219

[56] References Cited

U.S. PATENT DOCUMENTS

| | | | |
|---|---|---|---|
| 3,705,457 | 12/1972 | Tardoskegyi | 228/37 |
| 5,203,489 | 4/1993 | Gileta et al. | 228/219 |
| 5,228,614 | 7/1993 | Elliott et al. | 228/37 |
| 5,240,169 | 8/1993 | Gileta et al. | 228/180.1 |
| 5,294,036 | 3/1994 | Den Dopper | 228/37 |
| 5,388,752 | 2/1995 | Kawakatsu | 228/37 |
| 5,409,159 | 4/1995 | Connors et al. | 228/219 |
| 5,411,200 | 5/1995 | Connors et al. | 228/219 |

FOREIGN PATENT DOCUMENTS

| | | | |
|---|---|---|---|
| 4-339563 | 11/1992 | Japan | 228/37 |
| 6-304744 | 11/1994 | Japan | 228/219 |

*Primary Examiner*—Gary F. Paumen
*Assistant Examiner*—Jeffrey T. Knapp
*Attorney, Agent, or Firm*—Lorusso & Loud

[57] ABSTRACT

A soldering device includes a solder vessel for containing a molten solder, solder ejecting nozzle disposed in the solder vessel for upwardly ejecting the molten solder to form a solder wave thereabove, a cover plate covering the vessel and having an opening such that the solder wave can pass therethrough, a nozzle forming body provided adjacent at least one side of the solder wave to define a thin space between the nozzle forming body and the cover plate, and a gas feed conduit connected to the nozzle forming body for feeding a gas to the thin space, so that the gas is jetted through the thin space and flows toward the solder wave.

5 Claims, 3 Drawing Sheets

APPARATUS FOR WAVE SOLDERING PRINTED WIRING BOARDS

BACKGROUND OF THE INVENTION

This invention relates to an apparatus for wave soldering printed wiring boards.

It is known that when soldering is carried out in an inert gas atmosphere, oxidation of the molten solder is prevented so that the formation of dross may be avoided. The use of inert gas atmosphere is also desirable in performing microsoldering in which very small surfaces are soldered. Additionally, good soldering is attained even without flux or with only a small amount of flux when an inert gas atmosphere is used. Thus, various wave soldering apparatuses have been proposed for carrying out soldering in an inert atmosphere.

U.S. Pat. No. 5,203,489 and No. 5,240,169 disclose a wave soldering apparatus including a solder reservoir, a solder nozzle for forming a solder wave, a cover plate covering the reservoir and having a slot for the solder wave to pass therethrough, and gas discharging pipes disposed beneath the cover plate on both sides of the solder wave for forming a gas blanket over the solder wave.

U.S. Pat. Nos. 5,409,159 and 5,411,200 disclose a wave soldering apparatus including a solder reservoir, a solder nozzle for forming a solder wave, a cover overlying the reservoir and enclosing the solder wave, gas plenums each having a bottom plate submerged within the solder and side and top walls provided with orifices for jetting an inert gas toward the solder wave, and a gas delivery pipe disposed within each of the gas plenums for feeding the inert gas thereto.

With the known wave soldering apparatuses, however, it is necessary to feed a large amount of the inert gas to ensure non-oxidizing atmosphere both on the molten solder in the reservoir and on that portion of the printed wiring board which contacts with the solder wave.

SUMMARY OF THE INVENTION

In accordance with the present invention there is provided an apparatus for wave soldering a printed wiring board, comprising:

a solder vessel for containing a molten solder;

solder ejecting means having a wave nozzle disposed in said solder vessel for upwardly ejecting the molten solder therefrom to form a solder wave thereabove;

transfer means for transferring the printed wiring board along a predetermined path of travel so that the wiring board is contacted with the solder wave during the passage thereof through said path;

cover means having a cover plate covering over said vessel, said cover plate having an opening such that the solder wave can pass therethrough;

a nozzle forming body provided adjacent at least one side of the solder wave, said nozzle forming body having a first section secured to a lower side of said cover plate to define a gas chamber therebetween and a second section secured to a lower side of said cover plate and extending from said first section toward said opening to define a thin space between said second section and said cover plate, said thin space being in fluid communication with said gas chamber; and gas feed conduit means connected to said first section of said nozzle forming body for feeding a gas to said gas chamber, so that said gas fed to said gas chamber is jetted through said thin space and flows toward the solder wave.

In another aspect, the present invention provides an apparatus for wave soldering a printed wiring board, comprising:

a solder vessel for containing a molten solder;

first solder ejecting means having a first wave nozzle disposed in said solder vessel for upwardly ejecting the molten solder therefrom to form a primary solder wave thereabove;

second solder ejecting means having a second wave nozzle disposed in said solder vessel for upwardly ejecting the molten solder therefrom to form a secondary solder wave thereabove;

transfer means for transferring the printed wiring board along a predetermined path of travel so that the wiring board is successively contacted with said primary and secondary solder waves during the passage thereof through said path;

cover means having a cover plate covering over said vessel, said cover plate having first and second openings such that the primary and secondary solder waves can pass through said first and second openings, respectively;

a first nozzle forming body provided adjacent an upstream side of said primary solder wave with respect to the traveling direction of the printed wiring board, said first nozzle forming body having a first section secured to a lower side of said cover plate to define a first gas chamber therebetween and a second section secured to a lower side of said cover plate and extending from said first section toward said first opening to define a first thin space between said second section and said cover plate, said first thin space being in fluid communication with said first gas chamber;

first gas feed conduit means connected to said first section of said first nozzle forming body for feeding an inert gas to said first gas chamber, so that said inert gas fed to said first gas chamber is jetted through said first thin space toward said upstream side of said primary solder wave;

a second nozzle forming body provided adjacent a downstream side of said primary solder wave and an upstream side of said secondary solder wave with respect to the traveling direction of the printed wiring board, said second nozzle forming body having a first section secured to a lower side of said cover plate to define a second gas chamber therebetween, a second section secured to a lower side of said cover plate and extending from said first section of said second nozzle forming body toward said first opening to define a second thin space between said second section of said second nozzle forming body and said cover plate and a third section secured to a lower side of said cover plate and extending from said first section of said second nozzle forming body toward said second opening to define a third thin space between said third section of said second nozzle forming body and said cover plate, each of said second thin space and third thin space being in fluid communication with said second gas chamber;

second gas feed conduit means connected to said first section of said second nozzle forming body for feeding an inert gas to said second gas chamber, so that part of said inert gas fed to said second gas chamber is jetted through said second thin space toward said downstream side of said primary solder wave, with the other part of said inert gas fed to said second gas chamber being jetted through said third thin space toward said upstream side of said secondary solder wave;

a third nozzle forming body provided adjacent a downstream side of said secondary solder wave with respect to the traveling direction of the printed wiring board, said third nozzle forming body having a first section secured to a lower side of said cover plate to define a third gas chamber therebetween and a second section secured to a lower side of said cover plate and extending from said first section of said third nozzle forming body toward said second opening to define a fourth thin space between said second section of said third nozzle forming body and said cover plate, said fourth thin space being in fluid communication with said third gas chamber; and third gas feed conduit means connected to said first section of said third nozzle forming body for feeding an inert gas to said third gas chamber, so that said inert gas fed to said third gas chamber is jetted through said fourth thin space toward said downstream side of said secondary solder wave.

With the above-described conventional wave soldering apparatuses, the outside air has been found to enter the space above the molten solder contained in a solder vessel through the opening through which the solder wave passes, unless an inert gas is supplied in a large amount. It has also been found that the outside air enters into the space not only by diffusion but also as a result of an induced flow cocurrent with the running solder. Namely, since the running speed of the wave solder is relatively high, a gas stream is induced. Such an induced flow of the outside air has a relatively high flow velocity and is introduced together with the falling solder into the molten solder in the vessel to form gas bubbles. Since the outside air contains oxygen especially when the printed wiring boards are not present above the solder wave, the oxygen is contained in the gas bubbles to cause the oxidation of the solder. In the soldering apparatus according to the present invention, on the other hand, the outside air is prevented from forming such an induced flow and the gas bubbles formed are inert gas bubbles.

It is an object of the present invention to provide a soldering apparatus which can prevent the oxidation of the molten solder contained in a solder vessel.

Another object of the present invention is to provide an apparatus of the above-mentioned type which can minimize the consumption of an inert gas.

It is a further object of the present invention to provide a soldering apparatus which permits the soldering of printed wiring boards under an inert, substantially non-oxidizing atmosphere.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
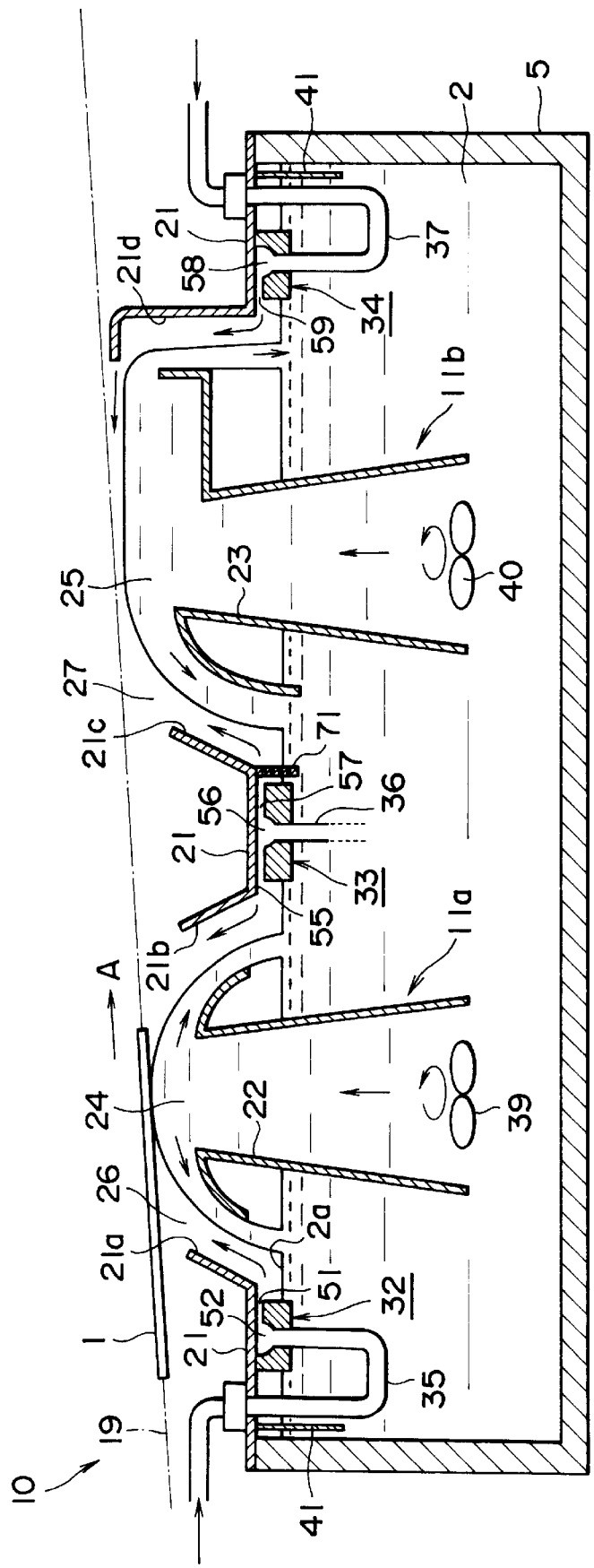
FIG. 1 is a cross-sectional, elevational view schematically illustrating a first embodiment of a soldering apparatus according to the present invention.
Figure 2:
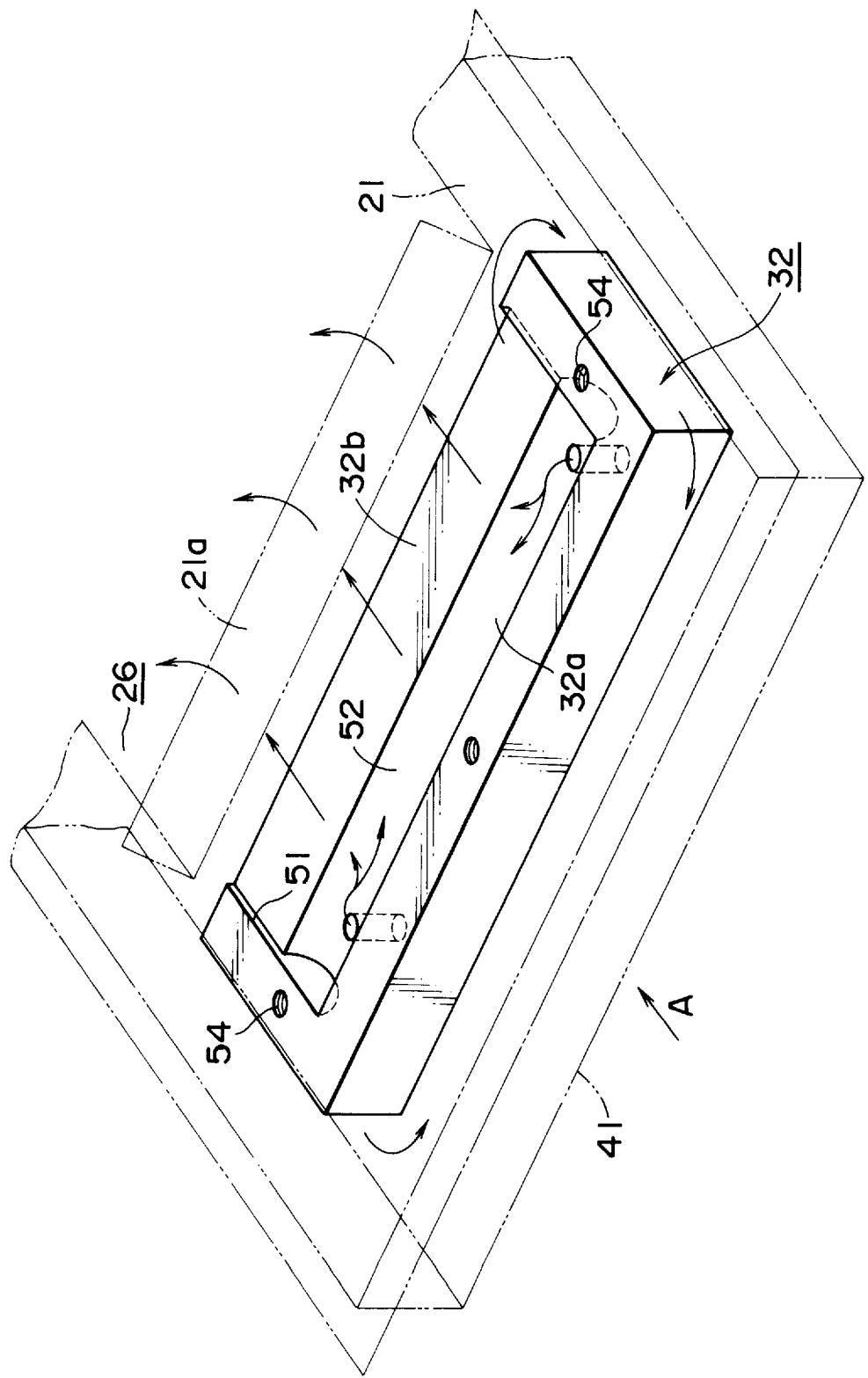
FIG. 2 is a top perspective view diagrammatically illustrating a nozzle forming body of the first embodiment of FIG. 1.
Figure 3:
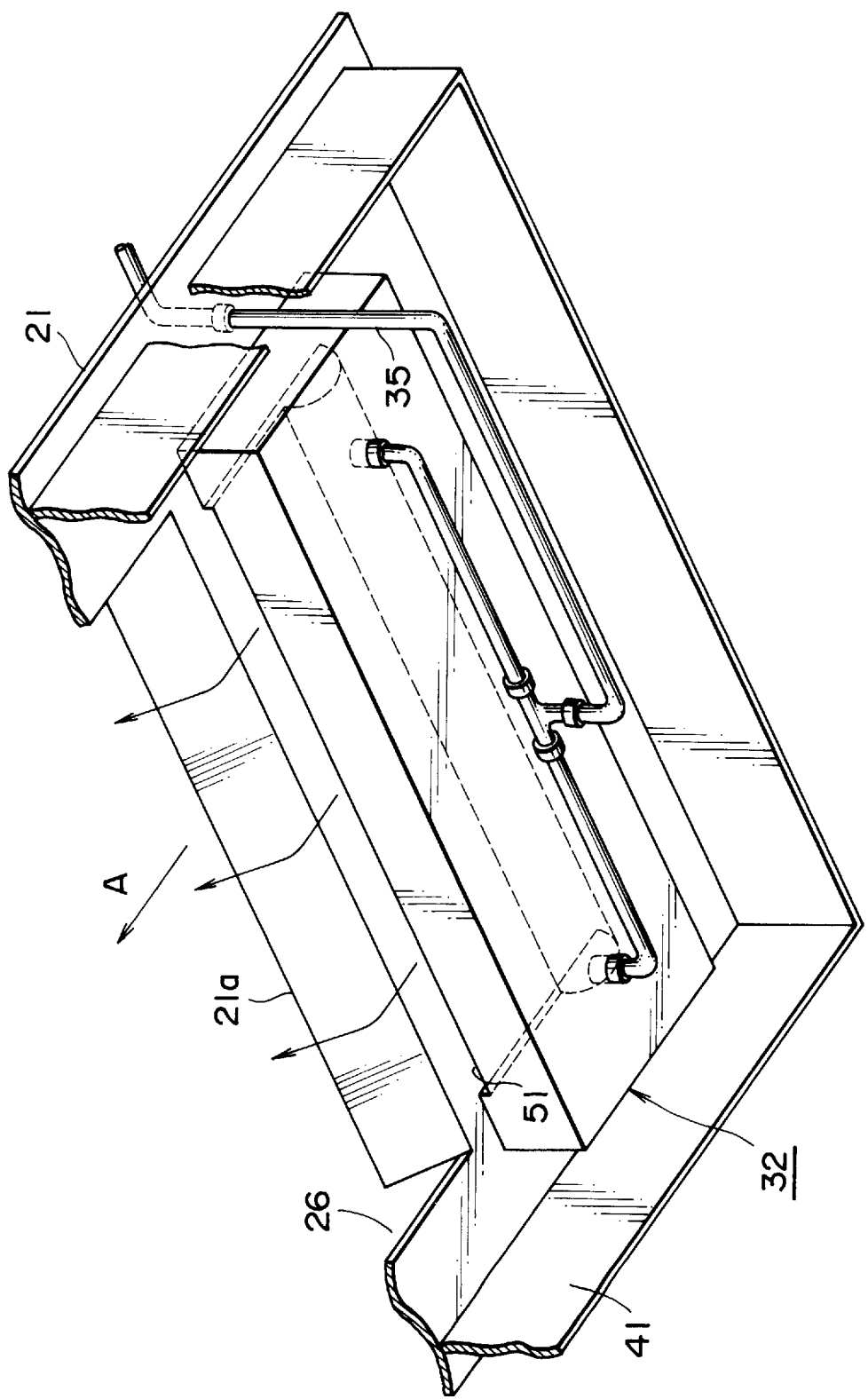
FIG. 3 is a bottom perspective view of the nozzle forming body of FIG. 2.

Referring now to FIGS. 1–3, designated generally as 10 is a soldering apparatus according to the present invention. The soldering apparatus 10 has a solder vessel 5 for containing a molten solder 2. A heater (not shown) is disposed in the vessel 10 for maintaining the molten solder 2 at a suitable temperature. Designated as 2a is the surface level of the molten solder 2 in the vessel 5.

First and second solder ejecting means 11a and 11b are juxtaposed in the solder vessel 5. The first solder ejecting means 11a has a first wave nozzle 22 disposed in the solder vessel 5 for upwardly ejecting the molten solder 2 therefrom by the operation of a pump 39 to form a primary solder wave 24, such as a turbulent wave, thereabove. Similarly, the second solder ejecting means 11b has a second wave nozzle 23 disposed in the solder vessel 5 for upwardly ejecting the molten solder 2 by the operation of a pump 40 therefrom to form a secondary solder wave 25, such as a laminar wave, thereabove.

A printed wiring board 1 is conveyed by transfer means 19 along a predetermined path in the direction shown by the arrow A so that the wiring board is successively contacted with the primary and secondary solder waves 24 and 25.

Cover means having a cover plate 21 is provided to cover over the vessel 5. The cover plate 21 has first and second openings 26 and 27 such that the primary and secondary solder waves 24 and 25 can pass through the first and second openings 26 and 27, respectively.

Designated as 32 is a first nozzle forming body provided adjacent an upstream side of the primary solder wave 24 with respect to the traveling direction A of the printed wiring board 1. As shown in FIG. 2, the first nozzle forming body 32 has a first section 32a secured to the lower side of the cover plate 21 to define a first gas chamber 52 therebetween and a second section 32b secured to a lower side of the cover plate 21 and extending from the first section 32a toward the first opening 26 to define a first thin space or slit 51 between the second section 32b and the cover plate 21, with the first thin space 51 being in fluid communication with the first gas chamber 52. Designated as 54 are threaded holes for use in connecting the nozzle forming body 32 to the cover plate 21.

First gas feed conduit means 35 is connected to the first section 32a of the first nozzle forming body 32 for feeding an inert gas to the first gas chamber 52. Thus, the inert gas supplied through the conduit 35 to the first gas chamber 52 is jetted through the first thin space 51 toward the upstream side of the primary solder wave 24 as shown by the arrows.

Preferably, a lower part of the first section 32a and a part of the gas feed conduit means 35 are submerged in the molten solder 2 in the vessel 5 so that the inert gas is preheated before the ejection through the thin space 51, whereby the soldering of the printed wiring board 1 may be effectively carried out in a stable manner. Further, as best seen in FIG. 3, the cover plate 21 has a downwardly extending skirt 41 submerged in the molten solder 2 so that the space between the cover plate 21 and the surface 2a of the molten solder 2 is closed except the openings 26 and 27. The skirt 41 also serves to heat the cover plate 21 and, hence, heat the inert gas passing through the openings 26 and 27. The cover plate 21 preferably has an upwardly bent portion 21a to guide the inert gas jetted from the thin space 51 to the solder wave 24.

As a result of the above construction, the distance between the lower side of the cover plate 21 and the upper surface 2a of the molten solder can be made very small. Further, because of the presence of the nozzle forming body 32 which is partly submerged in the molten solder 2, the volume of the space between the cover plate 21 and the solder surface 21 is very small. Therefore, even when the amount of the inert gas supplied through the conduit 35 is small, the space can be always filled with fresh inert gas without the outside air being diffused thereinto. Further, the narrow space between the cover plate 21 and solder surface 2a permits the jet stream of the inert gas from the nozzle 51 to flow at a high speed through the opening 26 even when the amount of the inert gas supplied is small, so that the outside air is prevented from forming an induced flow. Additionally, when the printed wiring board is present above the solder wave 24 as shown in FIG. 1, the underside thereof is maintained in the inert gas atmosphere so that the soldering of the printed wiring board can be performed under the non-oxidizing atmosphere.

With continuing reference to FIG. 1, an inert gas jetting structure similar to the above is also provided on the downstream side of the solder wave 24 and in each of the opposite sides of the solder wave 25.

Thus, a second nozzle forming body 33 is provided adjacent a downstream side of the primary solder wave 24 and an upstream side of the secondary solder wave 25. The second nozzle forming body 33 is secured to a lower side of the cover plate 21 to define a second gas chamber 56 and second and third thin spaces 55 and 57 between the second nozzle forming body 33 and the cover plate 21, with each of the second thin space 55 and third thin space 57 being in fluid communication with the second gas chamber 56. Second gas feed conduit means 36 is connected to the second nozzle forming body 33 for feeding an inert gas to the second gas chamber 56, so that part of the inert gas fed to the second gas chamber 56 is jetted through the second thin space 55 toward the downstream side of the primary solder wave 24, while the other part of the inert gas is jetted through the third thin space 57 toward the upstream side of the secondary solder wave 25.

In the illustrated embodiment, the common gas chamber 56 is used for communication with the second and third thin spaces 55 and 57. It is without saying that separate chambers each having a gas fed conduit means may be used for respective thin spaces 55 and 57.

A third nozzle forming body 34 is provided adjacent an downstream side of the secondary solder wave 25. The third nozzle forming body 34 is secured to a lower side of the cover plate 21 to define a third gas chamber 58 and a fourth thin space 59 between the third nozzle forming body 34 and the cover plate 21, the fourth thin space 59 being in fluid communication with the third gas chamber 58. Third gas feed conduit means 37 is connected to the third nozzle forming body 34 for feeding an inert gas to the third gas chamber 58, so that the inert gas fed to the third gas chamber 58 is jetted through the fourth thin space 59 toward the downstream side of the secondary solder wave 25.

The cover plate 21 preferably has upwardly bent portions 21b–21d to guide the inert gas jetted toward the solder waves 24 and 25.

Designated as 71 is a flow control plate having a plurality of perforations and optionally disposed in the inert gas passage defined between the cover plate 21 and the molten solder surface 2a. In the illustrated embodiment, the flow control plate 71 is provided adjacent the tip end of the third thin space 57 and extends downward from the cover plate 21 into the molten solder 2. By using the control plate 71 having suitable number of perforations having suitable area, the flow rate of the inert gas can be controlled to a desired range. Of course, similar flow control plate may be provided in each of the passages of the inert gas jetted from thin spaces 51, 55, 57 and 59 toward the solder waves 24 and 25.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An apparatus for wave soldering a printed wiring board, comprising:

a solder vessel for containing a molten solder;

solder ejecting means having a wave nozzle disposed in said solder vessel for upwardly ejecting the molten solder therefrom to form a solder wave thereabove;

transfer means for transferring the printed wiring board along a predetermined path of travel so that the wiring board is contacted with the solder wave during the passage thereof through said path;

cover means having a cover plate covering over said vessel, said cover plate having an opening such that the solder wave can pass therethrough;

a nozzle forming body provided adjacent at least one side of the solder wave, said nozzle forming body having a first section secured to a lower side of said cover plate to define a gas chamber therebetween and a second section secured to a lower side of said cover plate and extending from said first section toward said opening to define a thin space between said second section and said cover plate, said thin space being in fluid communication with said gas chamber; and gas feed conduit means connected to said first section of said nozzle forming body for feeding a gas to said gas chamber, so that said gas fed to said gas chamber is jetted through said thin space and flows toward the solder wave.

2. An apparatus as claimed in claim 1, wherein part of said first section and part of said gas feed conduit means are submerged within the molten solder in said vessel.

3. An apparatus as claimed in claim 1, further comprising a perforated plate provided between said nozzle forming body and said opening and extending downward from said cover plate into the molten solder in said vessel.

4. An apparatus for wave soldering a printed wiring board, comprising:

a solder vessel for containing a molten solder;

first solder ejecting means having a first wave nozzle disposed in said solder vessel for upwardly ejecting the molten solder therefrom to form a primary solder wave thereabove;

second solder ejecting means having a second wave nozzle disposed in said solder vessel for upwardly ejecting the molten solder therefrom to form a secondary solder wave thereabove;

transfer means for transferring the printed wiring board along a predetermined path of travel so that the wiring board is successively contacted with said primary and secondary solder waves during the passage thereof through said path;

cover means having a cover plate covering over said vessel, said cover plate having first and second openings such that the primary and secondary solder waves can pass through said first and second openings, respectively;

a first nozzle forming body provided adjacent an upstream side of said primary solder wave with respect to the traveling direction of the printed wiring board, said first nozzle forming body having a first section secured to a lower side of said cover plate to define a first gas chamber therebetween and a second section secured to a lower side of said cover plate and extending from said first section toward said first opening to define a first thin space between said second section and said cover plate, said first thin space being in fluid communication with said first gas chamber;

first gas feed conduit means connected to said first section of said first nozzle forming body for feeding an inert gas to said first gas chamber, so that said inert gas fed to said first gas chamber is jetted through said first thin space toward said upstream side of said primary solder wave;

a second nozzle forming body provided adjacent a downstream side of said primary solder wave and an upstream side of said secondary solder wave with respect to the traveling direction of the printed wiring board, said second nozzle forming body having a first section secured to a lower side of said cover plate to define a second gas chamber therebetween, a second section secured to a lower side of said cover plate and extending from said first section of said second nozzle forming body toward said first opening to define a second thin space between said second section of said second nozzle forming body and said cover plate and a third section secured to a lower side of said cover plate and extending from said first section of said second nozzle forming body toward said second opening to define a third thin space between said third section of said second nozzle forming body and said cover plate, each of said second thin space and third thin space being in fluid communication with said second gas chamber;

second gas feed conduit means connected to said first section of said second nozzle forming body for feeding an inert gas to said second gas chamber, so that part of said inert gas fed to said second gas chamber is jetted through said second thin space toward said downstream side of said primary solder wave, with the other part of said inert gas fed to said second gas chamber being jetted through said third thin space toward said upstream side of said secondary solder wave;

a third nozzle forming body provided adjacent a downstream side of said secondary solder wave with respect to the traveling direction of the printed wiring board, said third nozzle forming body having a first section secured to a lower side of said cover plate to define a third gas chamber therebetween and a second section secured to a lower side of said cover plate and extending from said first section of said third nozzle forming body toward said second opening to define a fourth thin space between said second section of said third nozzle forming body and said cover plate, said fourth thin space being in fluid communication with said third gas chamber; and third gas feed conduit means connected to said first section of said third nozzle forming body for feeding an inert gas to said third gas chamber, so that said inert gas fed to said third gas chamber is jetted through said fourth thin space toward said downstream side of said secondary solder wave.

5. An apparatus as claimed in claim 4, wherein part of said first section of each of said first through third nozzle forming bodies and part of each of said first through third gas feed conduit means are submerged within the molten solder in said vessel.

* * * * *